United States Patent [19]

Sivavec

[11] Patent Number: 5,427,688
[45] Date of Patent: Jun. 27, 1995

[54] DECONTAMINATION OF SOIL AND OTHER PARTICULATE MATTER

[75] Inventor: Timothy M. Sivavec, Clifton Park, N.Y.

[73] Assignee: General Electric Company, Schenectady, N.Y.

[21] Appl. No.: 132,493

[22] Filed: Oct. 6, 1993

Related U.S. Application Data

[63] Continuation of Ser. No. 978,586, Nov. 19, 1992, abandoned.

[51] Int. Cl.$^6$ .............................................. B01D 11/04
[52] U.S. Cl. ....................................... 210/639; 210/909
[58] Field of Search ............... 210/638, 639, 805, 806, 210/909, 634; 134/25.1, 26, 40

[56] References Cited

U.S. PATENT DOCUMENTS 4,662,948  5/1987  Weitzman .......................... 134/25.1
5,055,196 10/1991  Darian et al. ........................ 210/638

OTHER PUBLICATIONS

A S Abdul & T L Gibson, "Laboratory Studies of Surfactant-Enhanced Washing of Polychlorinated Biphenyl from Sandy Material", Environ. Sci. Tech. vol. 25, No. 4, 1991.

Primary Examiner—Frank Spear
Attorney, Agent, or Firm—Noreen C. Johnson; James Magee, Jr

[57] ABSTRACT

This invention relates to the removal of polychlorinated biphenyl compounds from a mass of particulate material such as soil, sand, or gravel by washing with an aqueous nonionic surfactant solution which is subsequently extracted with a water-immiscible organic solvent in which the nonionic surfactant is not soluble.

3 Claims, No Drawings

DECONTAMINATION OF SOIL AND OTHER PARTICULATE MATTER

This application is a Continuation of application Ser. No. 07/978,586, filed Nov. 19, 1992, now abandoned.

This invention is directed to removal of oily water insoluble contaminants from particulate materials and to decontamination of particulate materials by removal of nonvolatile contaminants such as polychlorinated biphenyls and petroleum oils by a process which includes liquid-liquid extraction means.

Polychlorinated biphenyls (PCB's) have long been known to have excellent chemical, thermal and dielectric properties and are chemically inert and nonreactive under ordinary circumstances so that new compounds can be formed of the PCB's only with extreme reagents and reaction conditions. Because of these physical and chemical properties, polychlorinated biphenyls have been used extensively with electrical insulating fluids in transformers and capacitors, industrial fluids, machining coolants, hydraulic systems and vacuum pumps. PCB's have also been used as fire retardants, heat transfer agents, and as plasticizers.

However, recent investigations have shown that polychlorinated biphenyls may cause considerable health and environmental problems. They have been found to be toxic to living cells in small amounts. They also have systematic toxic effects and are possibly carcinogenic agents due to the finding of induced neoplastic changes in rats. Prior to these findings, the PCB-contaminated waste from industry was frequently dumped into open pits and trenches without regard to possible side effects due to the presence of the pychlorinated biphenyls. Often the industrial waste containing the PCB's was in the form of petroleum-derived transformer oil and various other organic liquids. The presence of these oils or other organic liquids in the soil gave rise to even a further problem in effecting the removal of the PCB's from the soil since these petroleum-derived oils and other organic liquids possessed a strong affinity to the polychlorinated biphenyls. The soil is often saturated with these oils and other organic fluids thus making removal of the PCB's from the soil very difficult. Therefore, a need exists for methods capable of removing PCB's from soil and concentrating the PCB's into a relatively small volume for subsequent inciteration, the only term of disposal for PCB's presently approved by the Environmental Protection Agency.

Polychlorinated biphenyl compounds and petroleum oils are serious contaminants of many materials. The contamination of soils is a particularly difficult problem to overcome because of the difficulties encountered in handling large volumes of soil by presently available remediation techniques such as incineration.

Polychlorinated biphenyls have properties which make them ideally suited to various applications in heat transfer devices and electrical equipment such as transformers. In recent years, however, it has been suggested that these compounds pose a substantial threat to the public. Government regulations which control the use of such compositions are in effect. These regulations required discontinuation of the manufacture and use of polychlorinated biphenyls and remediation of any lands sites which have been contaminated with PCB or oils containing them. One of the main sources of PCB contamination is spillage of waste transformer oil during service of the transformer for removal of the PCB-containing oil.

SUMMARY OF THE INVENTION

The principal object of this invention is to provide an efficient method for removal of PCB contamination from a mass of particulate material such as soil or gravel.

Another object of the invention is to provide a method for reducing the volume of waste matter to be treated by other decontamination techniques by concentrating the contaminant in a smaller volume or mass of material.

These and other objects are achieved by a process which includes the steps of contacting the contaminated particulate material with a nonionic surface active agent in aqueous solution, thereby forming an admixture comprising a solid phase and a liquid phase, separating the aqueous phase from the solid particulate material, and extracting the liquid aqueous phase with an aliphatic hydrocarbon solvent to selectively separate the PCB from the aqueous nonionic surfactant solution. It will be appreciated that the surfactant solution can then be reused to wash PCB from additional portions of contaminated material.

DETAILED DESCRIPTION OF THE INVENTION

The method of this invention is based on the development of a liquid-liquid extraction process which has an ability to selectively and efficiently remove PCB and hydrocarbon oils from aqueous nonionic surfactant solutions. Choice of organic solvent and nonionic surfactant has resulted in extremely effective mass transfer of the PCB from the aqueous phase of the organic phase with equilibrium coefficients as high as 10,000. Such process will be found useful in many waste volume reduction procedures, soil washing and flushing techniques and other remediation technologies which employ surface active agents. Since a major source of PCB contamination is PCB-containing petroleum oils which are used in transformers and capacitors, it is necessary that the nonionic surfactant solution be capable of dissolving the oil in order to minimize or substantially prevent resorption of the PCB by any residual oil.

In liquid-liquid extraction technology one or more components are removed from a first liquid by intimate contact with a second liquid which is nearly insoluble in the first liquid. The second liquid dissolves the impurities or contaminants from the first liquid. Such extractions may be carried out by mixing the two liquids with agitation and then allowing them to separate by standing. Counter current flow can be used to providing mixing.

In the practice of this invention contaminated soil is admixed with the surfactant solution and thoroughly mixed for a period of time sufficient to substantially reduce the concentration of contaminant. Washing can be carried out at ambient temperature in a suitable apparatus such as a cool washer. Multiple washings can be done in order to provide successive reductions in PCB and oil concentration.

The water phase is then separated from the soil or particle material by any suitable settling means. The soil can then wholly or partially dried and returned to a land fill or give further treatment to remove other contaminants. The PCB-containing aqueous solution is then extracted with a water immiscible hydrocarbon solvent capable of dissolving the PCB and any associated petroleum oil and removing it from the aqueous surfactant solution. Various liquid-liquid extraction techniques such as simple mixing, without emulsion formation, or counter current flow can be employed.

Experimental results for a series of extractions of Aroclor 1254 from aqueous solutions of octylphenyl polyethoxylate (Triton X) by various aliphatic hydrocarbon and perfluoroalkane solvents are set forth in Tables 1 and 2.

the relative weight percent hydrophilic polyoxyethylene (POE) incorporated into the surfactant. A direct correlation between the hydrophilicity of the nonionic surfactant, as measured by its hydrophile-lipophile balance, HLB, and its PCB removal efficiency of equilibrium distribution coefficient is shown. The more hydrophilic the surfactant, the less tightly held is the solubilized contaminant within the surfactant micelle and the easier it is transferred into the organic phase.

The equilibrium distribution of a solute between phases is commonly described by an equilibrium distribution coefficient $K_D = W_{organic}/W_{aqueous}$, where $W_{organic}$ denotes weight fraction of the solute in the organic phase and $W_{aqueous}$ denotes weight fraction of the solute in the aqueous phase (raffinate). Equilibrium distribution coefficients for the organic extractants given in Tables 1 and 2 can be calculated.

TABLE 1

Equilibrium Table-Top Shaker Extractions of 1% Triton X-100 Surfactant Spiked with 188 ppm Aroclor 1254.
1:1 (v/v) Organic Solvent:Aqueous Surfactant, 125 rpm, room temp., 18 h sampling
Triton X-100: $C_8H_{17}$—$C_6H_4$—$O(CH_2CH_2O)_xH$, x = 10 HLB = 13.5

| Solvent | bp | Fp | ppm Aroclor 1254 in aq. soln after 18 h | % Aroclor 1254 removed after 18 h |
|---|---|---|---|---|
| Isooctane | 98–99° C. | 18° F. | 0.9 ppm | 99.5% |
| N-Hexane | 69° C. | −10° F. | 0.4 ppm | 99.76% |
| N-Octane | 125–127° C. | 60° C. | 0.3 ppm | 99.84% |
| N-Heptane | 98° C. | 30° C. | 0.3 ppm | 99.84% |
| 3M Fluorinert | 56° C. | none | 3.0 ppm | 98.40% |
| Perfluoro(methylcyclohexane) | 76° C. | none | 20.0 ppm | 89.36% |
| Petroleum ether | 50–110° C. | | 1.1 ppm | 99.41% |

TABLE 2

Equilibrium Table-Top Shaker Extractions of 1% Triton X-100, X-165 and X-305 Spiked with 188, 560 and 570 ppm
Aroclor 1254, Respectively. 1:1 (v/v) Organic Solvent:Aqueous Surfactant, 125 rpm, room temp., 18 h sampling.
Triton X-100: $C_8H_{17}$—$C_6H_4$—$O(CH_2CH_2O)_xH$, x = 10 HLB = 13.5
Triton X-165: $C_8H_{17}$—$C_6H_4$—$O(CH_2CH_2O)_xH$, x = 16 HLB = 15.8
Triton X-305: $C_8H_{17}$—$C_6H_4$—$O(CH_2CH_2O)_xH$, x = 30 HLB = 17.3

| Solvent | bp | 1% Triton X-100 % Aroclor 1254 removed after 18 h | 1% Triton X-165 % Aroclor 1254 removed after 18 h | % Triton X-305 % Aroclor 1254 removed after 18 h |
|---|---|---|---|---|
| Isooctane | 98–99° C. | 99.50% | 99.95% | 99.99% |
| N-Hexane | 69° C. | 99.76% | 99.98% | 99.99% |
| N-Octane | 125–127° C. | 99.84% | 99.99% | 99.99% |
| N-Heptane | 98° C. | 99.84% | 99.96% | 99.99% |
| 3M Fluorinert | 56° C. | 98.40% | 95.24% | 97.47% |
| Perfluoro(methylcyclohexane) | 76° C. | 89.36% | 97.24% | 98.91% |
| Petroleum ether | 50–110° C. | 99.41% | 99.96% | 99.99% |

Solvent properties that are generally desirable for an extraction process removing organic solutes from water include: high capacity for solute(s) of interest, selectivity for solute(s) of interest, chemical stability, easy regeneration, sufficiently low cost (so that replacement and initial inventory of solvent will not be dominant factors), nontoxicity, noncontaminating, noncorrosive and nonflammable or high flash point.

Experimental results are given in Tables 1 and 2, along with solvent boiling points and flash points, for a series of aliphatic hydrocarbon and perfluoroalkane solvents and their ability to extract a moderately chlorinated PCB mixture, Aroclor 1254, in octylphenol polyethoxylate (Triton ®X, Union Carbide) surfactant solutions. The organic solvents listed in Tables 1 and 2 were chosen from a much larger series of solvents screened for their PCB extraction efficiencies because they demonstrated superior equilibrium distribution coefficients as well as not forming emulsion with the aqueous nonionic surfactants.

Table 1 shows the percentage Aroclor 1254 removed from an aqueous 1% Triton ® X-100 solution spiked with 188 ppm Aroclor 1254 after solvent extraction for 18 hours. Also shown is the concentration of Aroclor 1254 remaining in the aqueous surfactant phase.

Table 2 shows the removal efficiencies of a series of aliphatic hydrocarbon and perfluoroalkane solvents for Aroclor 1254 from a series of octylphenol polyethoxylate nonionic surfactants. The surfactants differ only in Tables 3 and 4 show experimental data for two organic solvents and a variety of nonionic surfactant types. These were obtained, as was the data in Tables 1 and 2, by contacting equal volumes of organic extractant and 1% aqueous surfactant solution in a diffusion cell in which the two phases were shaken by a table top orbital shaker at a speed at which the liquid-liquid interface was not destroyed. All extractions were carried out at room temperature. The aqueous and/or organic phases were sampled at equilibrium (typically >12 h). A high pressure liquid chromatograph method for the quantification of PCBs was used. The absorbance of PCBs was measured at 254 or 225 nm, and the concentration of PCBs in aqueous nonionic surfactant solutions and aliphatic hydrocarbon solvents was determined by comparison of peak areas with those from standard solutions (1 to 600 ppm Aroclor mixtures 1242, 1254 or 1260 in surfactant solutions and 1 to 1000 ppm Aroclor mixtures 1242, 1254 or 1260 in hexane, for example). PCB calibration standards were prepared and used to match exactly the aqueous surfactant or solvent solution being sampled, as peak areas were found to differ for various surfactants and solvents on the column.

TABLE 3

Equilibrium 2,2,4-Trimethylpentane (Isooctane) Extractions of 1% Aqueous Nonionic and Anionic Surfactants Spiked with Varying Amoutns of Aroclor 1254. 1:1 (v/v) Isooctane:Aqueous Surfactant, 125 rpm, room temp., 4 d sampling.

| HLB | Surfactant Type | Initial ppm Aroclor 1254 | ppm Aroclor 1254 in aq. soln after 4 d | % Aroclor 1254 removed after 4 d | Equil. Distrib. Coefficient |
|---|---|---|---|---|---|
| 16.9 | Polyoxyethylene (40) Stearate | 570 | 0.1 ppm | 99.98% | 5000 |
| 16.9 | Polyoxyethylene (23) Lauryl Ether | 570 | 0.1 ppm | 99.99% | 10000 |
| 15.8 | Octylphenol Polyethoxylate (16) | 560 | 0.1 ppm | 99.99% | 10000 |
| 17.3 | Octylphenol Polyethoxylate (30) | 570 | 0.1 ppm | 99.99% | 10000 |
| 16.7 | Polyoxyethylene (20) Sorbitan Monolaurate | 510 | 1.7 ppm | 99.66% | 293 |
| 14.1 | Nonylphenol Polyethoxylate (10) | 500 | 1.7 ppm | 99.66% | 293 |
| 15.0 | Nonylphenol Polyethoxylate (15) | 500 | 1.0 ppm | 99.88% | 832 |
| —40 | Sodium dodecylbenzenesulfonate (SDBS), Anionic | 500 | 0.6 ppm | 99.96% | 2500 |

TABLE 4

Equilibrium n-Hexane Extractions of 1% Aqueous Nonionic and Anionic Surfactants Spiked with Varying Amounts of Aroclor 1254. 1:1 (v/v) n-Hexane:Aqueous Surfactant, 125 rmp, room temp., 4 d sampling.

| HLB | Surfactant Type | Initial ppm Aroclor 1254 | ppm Aroclor 1254 in aq. soln after 4 d | % Aroclor 1254 removed after 4 d | Equil. Distrib. Coefficient |
|---|---|---|---|---|---|
| 16.9 | Polyoxyethylene (40) Stearate | 570 | 0.1 ppm | 99.99% | 10000 |
| 16.9 | Polyoxyethylene (23) Lauryl Ether | 570 | 0.1 ppm | 99.99% | 10000 |
| 15.8 | Octylphenol Polyethoxylate (16) | 560 | 0.1 ppm | 99.99% | 10000 |
| 17.3 | Octylphenol Polyethoxylate (30) | 570 | 0.1 ppm | 99.99% | 10000 |
| 16.7 | Polyoxyethylene (20) Sorbitan Monolaurate | 510 | 2.3 ppm | 99.54% | 216 |
| 14.1 | Nonylphenol Polyethoxylate (10) | 500 | 1.6 ppm | 99.68% | 311 |
| 15.0 | Nonylphenol Polyethoxylate (15) | 500 | 0.6 ppm | 99.88% | 832 |
| —40 | Sodium dodecylbenzenesulfonate (SDBS), Anionic | 500 | 1.0 ppm | 99.80% | 500 |

The practice of this invention provides for reuse of the surfactant solution with substantially no requirement for additions of surfactant to make up for loss of surfactant during extraction caused by solubility of surfactant in the organic phase. In generally, only small amounts of low molecular weight surfactant oligomers are soluble in solvents such as n-hexane. Use of higher weight average oligomers it is possible to minimize the amount of surfactant extracted by the hydrocarbon solvents.

In order to reduce the extent of solvent loss in the extraction process, it is preferred that solvents with low solubility in water or aqueous surfactant solutions be employed. In general, low molecular weight solvents have a solubility which would require recovery of the solvent from the raffinate or aqueous phase. Recovery can be accomplished by available means such as steam stripping.

Table 5 below shows solubility data for various organic extractants in water and representative surfactant solutions.

TABLE 5

Solubility of Organic Extractants in Aqueous Surfactant Solutions

| Solvent | Solubility in H$_2$O, 25° C. | Triton X-100 | Triton X-165 | Triton X-305 |
|---|---|---|---|---|
| Isooctane | 2.2 ppm | 1280 ppm | 360 ppm | 250 ppm |
| N-Hexane | 13.3 ppm | 1450 ppm | 1200 ppm | 880 ppm |
| 3M Fluorinert (FC-72) | | 440 ppm | 197 ppm | 186 ppm |
| Perfluoro(methyl-cyclohexane) (FC-84) | | 60 ppm | 60 ppm | 60 ppm |

Preferred organic solvents for extraction of polychlorinated biphenyl and hydrocarbon oils such as transformer oil from aqueous nonionic surfactant solutions are the aliphatic hydrocarbons especially those containing from about 5 to about 12 carbon atoms and petroleum ether. Particularly preferred solvents include n-hexane, n-heptane, n-octane, isooctane, n-dodecane, and petroleum ether. In general, the solvents suitable for use in this process are those having a distribution coefficients between about 2000 and 10,000 and which do not form emulsions with the surfactant solution upon vigorous agitation.

The following tables show results of soil washing experiments in which PCB-contaminated natural soil was a 3 gram sample was washed with three different aqueous wash liquids containing nonionic surfactants at a level of about 1% by weight at room temperature for 24 hours. Each wash liquid contained the equivalent of about 305 ppm of Aroclor 1254. The wash liquids were then extracted by counter current flow with n-hexane and n-dodecane to selectively extract the PCB and any associated hydrocarbon oil from the aqueous phase. It was found that about 99% of the Aroclor 1254 was extracted and less than about 6% of the surfactant was extracted into the organic phase.

Table 6 describes the nonionic surfactants used to wash the soil samples.

Table 7 shows the results of liquid-liquid counter current extraction of the PCB from the aqueous phase into hexane.

Table 8 shows corresponding results for extraction by n-dodecane.

TABLE 6

1% Aqueous Surfactant Washing of PCB-Contaminated Soil

| Sur-factant | Description | HLB | Concentration Ar. 1254 in 40.0 mL aq. surfactant extractant, ppm | Concentration Ar. 1254 in 30.00 g soil sample ppm |
|---|---|---|---|---|
| 1 | POE (20) sorbitan monolaurate | 16.7 | 191 | 2547 |
| 2 | octylkphenol POE (16) | 15.8 | 194 | 2586 |
| 3 | C10 and C12 alcohol POE (5.5) | 12.0 | 305 | 4065 |

TABLE 7

Results of n-Hexane Extraction of Aqueous Surfactant Washes Generated from PCB-Contaminated Soils

| Sur-factant | Concentration of Aroclor 1254 in extractant, ppm | ppm Ar. 1254 unextracted by n-hexane | % Aroclor removed | Equilibrium Distribution Coefficient $K_D$ |
|---|---|---|---|---|
| 1 | 191 | 0.7 | 99.63 | 272 |
| 2 | 194 | 0.1 | 99.95 | 1939 |
| 3 | 305 | <0.1 | >99.97 | >3049 |

TABLE 8

Results of n-Dodecane Extraction of Aqueous Surfactant Washes Generated from PCB-Contaminated Soils

| Sur-factant | Concentration of Aroclor 1254 in extractant, ppm | ppm Ar. 1254 unextracted by n-dodecane | % Aroclor removed | Equilibrium Distribution Coefficient $K_D$ |
|---|---|---|---|---|
| 1 | 191 | 1.1 | 99.42 | 173 |
| 2 | 194 | 0.6 | 99.69 | 322 |
| 3 | 305 | 0.2 | 99.93 | 1524 |

Aroclor 1254 is used as a representative chlorinated biphenyl. It contains 54 weight percent chlorine and the full spectrum of congeners from 1 to 10 chlorine atoms per biphenyl nucleus. The term PCB is commonly used as an abbreviation for polychlorinated biphenyl. The majority of PCBs are mixtures of isomers particularly the dichloro-, trichlori-, tetrachloro-, pentachloro-, hexachloro-, and heptachloro-isomers.

The data in Tables 6, 7 and 8 were obtained by an experimental procedure in which 3 gram samples of PCB contaminated soil were washed with 40 milliliters (ml) of a 1% aqueous nonionic surfactant solution and agitated for 24 hours on an orbital shaker at 200 rpm. This agitation was sufficient to suspend the soil particles in the wash liquid. A 5 ml. portion of the supernatant was withdrawn for the solvent extraction procedure as described below and a 1.5 ml sample taken to determine the amount of PCB removed by high pressure liquid chromotography.

The 5 ml. sample of aqueous wash liquid was mixed with an equal volume of n-hexane or n-dodecane and shaken at 125 rpm, a speed which did not destroy the liquid-liquid interface. After an extraction time of 48 hours at room temperature, the amount of PCB in the aqueous phase was determined by HLPC.

What is claimed is:

1. A process for removing contaminants comprising polychlorinated biphenyls and associated petroleum oil from a mass of particulate matter which comprises contacting the particulate matter with an aqueous wash liquid consisting essentially of an aqueous liquid containing an effective amount of a nonionic surfactant for a period of time sufficient to solubilize or suspend the polychlorinated biphenyls and associated petroleum oil in the aqueous wash liquid, separating the wash liquid from the particulate matter, and extracting the polychlorinated biphenyls and associated petroleum oil from the wash liquid by liquid-liquid extraction with an aliphatic hydrocarbon or perfluoralkane solvent selected from the group consisting of isooctane, N-hexane, N-octane, N-heptane, N-dodecane, perfluorohexane, perfluoro(methylcyclohexane), and petroleum ether.

2. A process according to claim 1 wherein the wash liquid is an aqueous solution containing from about 0.1 to about 10 weight percent of an ethoxylated aliphatic alcohol or alkylphenol containing from about 3 to about 30 polyoxyethylene groups, ethoxylated sorbitan esters containing from about 5 to 20 polyoxyethylene groups and ester functionality (R) chosen from the group of laurate, palmitate, stearate, and oleate, or ethoxylated organic acids containing from about 5 to 100 polyoxyethylene groups.

3. A process according to claim 2 wherein the sorbitan esters have the structure

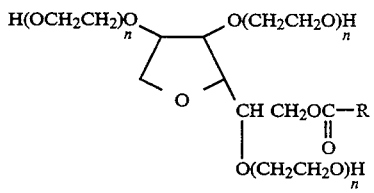

wherein n is from about 5 to about 20 and R is selected from the group consisting of —$(CH_2)_x CH_3$ and —$(CH_2)_7 CH= CH(CH_2)_7 CH_3$ in which x is from 10 to 16.

* * * * *